(12) United States Patent
Ritter et al.

(10) Patent No.: US 10,394,781 B2
(45) Date of Patent: Aug. 27, 2019

(54) SYNCHRONIZATION OF OFFLINE DATA

(71) Applicant: SAP SE, Walldorf (DE)

(72) Inventors: Gerd Ritter, Heidelberg (DE); Marco Eidinger, San Francisco, CA (US); Rene Gross, Heidelberg (DE)

(73) Assignee: SAP SE, Walldorf (DE)

( * ) Notice: Subject to any disclaimer, the term of this patent is extended or adjusted under 35 U.S.C. 154(b) by 311 days.

(21) Appl. No.: 14/976,479

(22) Filed: Dec. 21, 2015

(65) Prior Publication Data
US 2017/0177695 A1   Jun. 22, 2017

(51) Int. Cl.
*G06F 17/30* (2006.01)
*G06F 16/22* (2019.01)
*G06F 16/27* (2019.01)

(52) U.S. Cl.
CPC .......... *G06F 16/2255* (2019.01); *G06F 16/27* (2019.01)

(58) Field of Classification Search
CPC ...................................................... G06F 17/30
See application file for complete search history.

(56) References Cited

U.S. PATENT DOCUMENTS

| | | | | |
|---|---|---|---|---|
| 2006/0064470 | A1* | 3/2006 | Sargent | H04L 67/2847 |
| | | | | 709/219 |
| 2006/0080427 | A1* | 4/2006 | Yach | G06F 17/30575 |
| | | | | 709/224 |
| 2008/0162486 | A1* | 7/2008 | Bells | G06F 17/30581 |
| | | | | 707/999.01 |
| 2010/0198783 | A1* | 8/2010 | Wang | G06F 17/30581 |
| | | | | 707/610 |
| 2014/0379648 | A1* | 12/2014 | Chiu | G06F 17/30174 |
| | | | | 707/624 |

\* cited by examiner

*Primary Examiner* — Khanh B Pham
(74) *Attorney, Agent, or Firm* — Mintz Levin Cohn Ferris Glovsky and Popeo, P.C.

(57) ABSTRACT

A method includes initiating, at backend server, a process for synchronization of a data record stored locally on a client computing device with a corresponding data record stored in a backend database. The synchronization process includes comparing the hash value of the data record stored locally on the client computing device and the hash value of the corresponding data record stored in the backend database, and based on the comparing, sending information about the corresponding data record stored in the backend database to the client computing device, if needed for updating the data record stored locally on the client computing device.

19 Claims, 5 Drawing Sheets

500

510
initiating, at backend server, synchronization of a data record stored locally on a client computing device with a corresponding data record stored in a backend database

520
receiving a hash value of the data record stored locally on a client computing device

530
retrieving a hash value of the corresponding data record from a cache on the backend server

540
comparing the hash value of the data record stored locally on a client computing device and the hash value of the corresponding data record stored in the backend database

550
based on the comparing, sending information about the corresponding data record stored in the backend database to the client computing device
(The client computing device may use the information received from the backend server to update the data record stored locally on the client computing device)

FIG. 5

SYNCHRONIZATION OF OFFLINE DATA

BACKGROUND

Computing solutions or applications (e.g., business applications including enterprise resource planning (ERP), enterprise content management (ECM), business process management (BPM) and product lifecycle management applications, etc.) are commonly installed on "backend" computer systems that deal with databases and have data processing components. Each backend computer system's infrastructure may consist of one or more physical machines, virtual machines, central processing units, data storage devices, disk drives and other resources, distributed over diverse locations or nodes connected by a computer network or the Internet. Some business applications may be interactive. Such business applications, for example, may have a user interface on a "frontend" client device (e.g., laptop computer, desktop computer, smartphone, personal or private digital assistant, tablets, notebook computer, etc.) through which users (e.g., business users) can query, modify or input data (data stored, e.g., in business databases) and view results instantaneously. The users may also run analytics and reports instantaneously. Some business applications may be run in batch mode i.e. they may be set up to run (e.g., to update databases) based on a predetermined event/time and the users do not need to initiate them or monitor them.

Users on client computing devices can connect to a backend computer system (via the Internet or other computer networks) to remotely interact with the business applications and databases hosted on the backend computer system. The client computing devices can be "online" or "offline." The terms "online" and "offline" may have specific meanings in regard to computer technology and telecommunications in which "online" indicates a state of connectivity, while "offline" indicates a disconnected state. Users may interactively prepare or modify data (including business objects such as data input forms, purchase orders, invoices, etc.) for consumption or processing by the business application when connected online to the backend computer system. Conversely, users may prepare new data or modify data (including business objects such as data input forms, purchase orders, invoices, etc.) locally on the client computing devices when offline, and later, when online, upload or transmit the new data or modified data to the backend computer system for consumption or processing by the business application.

Consideration is now being given to systems and method for synchronizing data on backend computer systems, which host business applications, and data on frontend client computing devices, which operate or interact with the business applications in either online or offline modes.

SUMMARY

Business data may include structured business data (i.e. business data identifiable by associated technical keys or codes) and unstructured business data (i.e. "code-less" business data that is not associated with technical keys or codes). For convenience in description herein, the terms "business data," "data," "block(s) of data," and "data record(s)" may be used interchangeably. A data record may, for example, be structured business data or may be "code-less" unstructured business data.

In a general aspect, a business computing system includes a backend server coupled to a backend database, which may store business data. A computer network connection makes the backend server accessible to a client computing device, which may also store business data. The backend server initiates synchronization of a data record stored locally on the client computing device with a corresponding data record stored in the backend database. The backend server compares a hash value of the data record stored locally on the client computing device and a hash value of the corresponding data record stored in the backend database, and based on the comparison, sends information about the corresponding data record stored in the backend database to the client computing device.

In an aspect of the business computing system, the backend server initiates synchronization of the data record stored locally on the client computing device, for example, automatically when the client computing device comes online, or on demand upon receiving a request from the client computing device.

The details of one or more implementations are set forth in the accompanying drawings and the description below. Other features will be apparent from the description and drawings, and from the claims.

BRIEF DESCRIPTION OF THE DRAWINGS

FIG. 5 is an illustration of an example method for sharing and distributing data across backend databases and various client computing devices in a business computing system, in accordance with the principles of the disclosure herein.

Like reference symbols in the various drawings indicate like elements.

Figure 1:
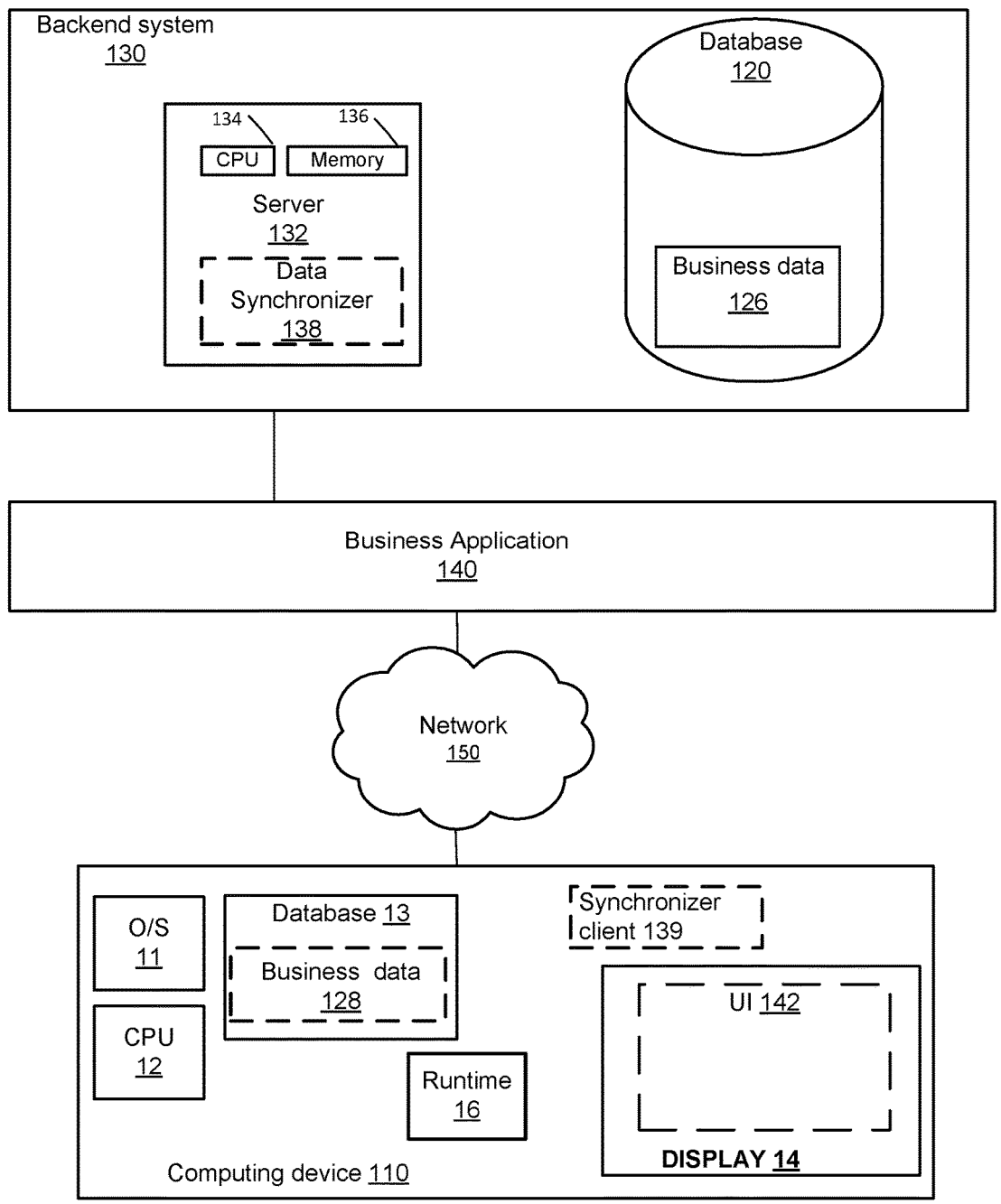
FIG. 1 is a schematic block diagram illustrating an example system, which may be used to implement a business computing solution, in accordance with the principles of the present disclosure.

The details of one or more implementations are set forth in the accompanying drawings and the description below. Other features will be apparent from the description and drawings, and from the claims.

DETAILED DESCRIPTION

A "business" computing solution may involve a backend computer system hosting a business application (e.g., a business application such as an enterprise resource planning (ERP), an enterprise content management (ECM), a business process management (BPM) or a product lifecycle management application, etc.) and one or more frontend delivery vehicles (mobile apps, web browsers, desktop applications, connected objects, application agents, etc.) that are hosted on client computing devices (e.g., laptop computers, desktop computers, mobile devices, smartphones, etc.). The computing solution may, for example, involve manipulating, preparing or consuming business data, which may be stored in "backend" databases in the backend computer system, and also involve manipulating, preparing or consuming business data, which may be stored in "local" databases or data stores in the client computing devices.

The business data manipulated or processed by the computing solution may be stored in the databases as "structured" and/or "unstructured" business data objects. Structured business data objects may include data ("data records") that can be associated with technical keys (e.g., time stamps, code values, version numbers, etc.), which may, for example, indicate which data records have been changed or indicate when the data records were created. As an example, structured business data objects may include transaction data of day-to-day business events (e.g., prices quotes, sales invoices, payroll disbursements or other business documents, which can be indexed or coded with consecutive version numbers or time stamps as and when the business documents are generated). In contrast to structured business data objects, unstructured (or "code-less") business data objects may include data (e.g., a block of data or "data records") that are not associated with technical keys (e.g., time stamps, code values, etc.) that indicate that the data records have been changed or indicate when the data records were created. As an example, unstructured business data objects may include business configuration data (e.g., product prices, fiscal year end, default currency, default language, number and types of production plants, sales organizations, warehouses, distribution channels, visibility of fields, configuration of the business process like quote generation etc.), key user changes (e.g., properties of fields, new or changed translation of texts) and other settings and parameters that may be used, for example, for defining business processes and data warehousing in the business computing solution.

In accordance with the principles of the present disclosure, systems and methods ("data synchronizing systems and methods") are described herein for synchronizing business data stored in the backend databases and the business data stored in the local databases, for example, for use at the backend computer system and at the client computing devices, respectively, by a business computing solution.

The data synchronizing systems and methods may include identifying a data record in a first database that is different than a corresponding data record in a second database and replacing the "different" data record in the first database by the corresponding data record from the second database. Brute force comparison of voluminous business data records (e.g., byte-by-byte) to identify differences in data records stored in different databases can be computationally expensive and time consuming. In contrast to brute force comparison of entire data records, the data synchronizing systems and methods described herein involve hashing the data records, followed by a computationally simpler comparison of hash values (or message digests) to identify that the data record in the first database is different than the corresponding data record in the second database, in accordance with the principles of the present disclosure.

If the hash value of a data record in the first database is different than the hash value of a corresponding data record in the second database, then the databases may be synchronized, for example, by replacing the "different" data record in the first database by the corresponding data record from the second database.

FIG. 1 shows a schematic block diagram of a system 100, which may be used to implement a business computing solution, in accordance with the principles of the present disclosure.

System 100 may include a backend computer system 130, which hosts a business application 140, and is connected to one or more client computing devices (e.g., computing device 110) via a computer network or the Internet (e.g., network 150). Business application 140 may have a frontend (e.g., UI 142, which may include frontend delivery vehicles, application agents, web browsers, etc.) presented on client device 110 through which a user can operate or interact with business application 140 from client device 110.

Backend computer system 130 may include one or more servers (e.g., server 132) to run business application 140 and one or more databases (e.g., database 120), which may store data (e.g., business data 126) that is manipulated or processed by business application 140. Server 132 may include one or more CPUs and memories (e.g., CPU 134 and memory 136), which may be configured to deliver, for example, various content (e.g., business data 126, application agents, frontend user interface (UI 142), data storage, applications, etc.) to client computing devices (e.g., computing device 110) via network 150.

A client computing device (e.g., computing device 110) may, for example, be a desktop computer, a notebook computer, a netbook computer, a tablet computer, a smartphone or another mobile computing device, etc. An example computing device 110 may include an operating system (e.g., O/S 11), one or more processors (e.g., CPU 12), one or more memories (e.g., database 13), and a display (e.g., display 14). Computing device 110 may execute a runtime 16 and various applications (e.g., a web application, a word processing application, a spreadsheet application, business application 140 agents, etc.) to process locally stored data (e.g., business data 128) for business application 140.

Further, server 132 may include a data synchronizer 138, which may be configured to update or synchronize applications data, over network 150, so that applications on computing device 110 and applications on backend computer system 130 have, for example, the same data to work with. Data synchronizer 138 may, for example, be configured to synchronize data available to business application 140 on the server side (e.g., business data 126 stored in database 120) and the data available for business application 140 on the one or more client computing devices (e.g., business data 128 stored in database 13). Data synchronizer 138 may monitor the data records stored in database 120 and the data records stored in database 13 and update or synchronize the data records at regular or pre-determined intervals, or in response to specific events (e.g., when a user logs in on a client device, when the client device comes online or upon user request).

While there may be instances when the client computing devices are online (i.e., physically connected to the backend computer system via a network connection or the Internet), there may be other instances when the client computing devices are offline (i.e. disconnected from the backend computer system). When online, the client computing devices may have access via the network connection or the Internet to data (e.g. business data 126) in the backend databases. In contrast, when offline, the client computing devices may have access only to data (e.g., business data 128) stored in "local" databases or data stores (e.g., database 13) in the client computing devices.

In yet other instances, the client computing devices may be online (i.e., physically connected to the backend computer system via a network connection or the Internet), but the frontend delivery vehicles (e.g., application agents, web browsers, etc.) on the client computing devices may be offline. Even when offline, the frontend delivery vehicles may be used to manipulate, prepare or consume data (e.g., business data 128) stored in local databases on the client computing devices. For example, in the context of a common email application, a mail user agent (MUA) (e.g., Microsoft Outlook) on a client device can be instructed to be in either online or offline states. When online, the MUA may attempt to connect to the back end system (e.g., mail servers), for example, to check for new mail at regular intervals, and when offline the MUA may not attempt to make any such connection. However, even when offline, the MUA may still be used to work with and manipulate, for example, previously downloaded mail stored in a local data store (e.g., a mail inbox) on the client device. As another example, in the context of web browsing, a web browser on a client device can be instructed to be in either online or offline states. The web browser may attempt to fetch pages from backend web servers only while in the online state. In the web browser's offline state (e.g., when connection to the Internet is impossible or undesirable), the web browser can be used for offline browsing, in which web pages can be browsed using local copies of web pages that have been previously downloaded in a local data store (e.g., a web page cache) on the client device.

For convenience in description herein, the instances in which the frontend delivery vehicles (e.g., MUA, web browser) are offline and then become online may be considered to present the same or similar data synchronization issues as the instances in which the client computing devices themselves are physically offline and then become online.

With renewed reference to FIG. 1, operation of data synchronizer 138 may, for example, be co-ordinated or integrated with operation of a corresponding synchronization client 139 (or other corresponding system-specific client software) running on computing device 110. In operation, data synchronizer 138 may communicate with computing device 110 components (e.g., database 13, client synchronizer 139, etc.) causing data updates or changes on one side to be propagated to the other so that both sides contain the same data. Conversely, synchronization client 139 (or other corresponding system-specific client software) running on computing device 110 may communicate with backend system 130 components and resources (e.g., server 132, data synchronizer 138, database 120, etc.) causing data updates or changes on one side to be propagated to the other so that both sides contain the same data.

Data synchronizer 138 (and/or client synchronizer 139) may include processes or algorithms for identifying which data records (in either database 120 or in database 13) have been changed or updated and need to be synchronized across the databases. These algorithms may include traditional "key-based" identifying algorithms that are used to identify the changed or updated data records based on technical keys (e.g., time stamps or code values) associated with changes in the data records. A time stamp or code value may be associated with a data record, for example, indicate the last time the data record was changed in either database 120 or in database 13. Such algorithms may be useful or sufficient to quickly identify the changed or updated data records when the business data objects in the databases are structured (e.g., when the data records can be associated with time stamps or code values which indicate which data records are new and which data records are old).

For the case of unstructured (or "code-less") business data objects, the algorithms in data synchronizer 138 (and/or client synchronizer 139) for identifying which data records (in either database 120 or in database 13) have been changed or updated and need to be synchronized across the databases may include "hash value-based" identifying algorithms. Further, data synchronizer 138 may include processes (e.g., hash key determination processes 137, FIG. 2) using a hash function for computing a hash value (e.g., an "n" character hash value) for each data record processed. Data synchronizer 138 may be configured to compute hash values for the data records in business databases (e.g., database 120) and store the hash values in a cache.

In example implementations, large business databases (e.g., database 120) may contain a very large number (e.g., millions) of data records—only a small fraction of which may be expected to be changed or updated by various data sources over a time period (especially for unstructured or code-less business data objects). To avoid computational load and database access time issues, data synchronizer 138 may be scheduled to compute hash values for the data records in the large business databases (e.g., database 120) at select "hash-computation" time points (e.g., periodically every 4 hours) and store the hash values in a cache. The cached hash values may be considered to valid for a time period (e.g. 4 hours) extending up to the next scheduled hash-computation time point. The hash value-based algorithms in data synchronizer 138 (and/or client synchronizer 139) may compare the cached hash value of a data record in a first database (e.g., in database 120), which is valid for the current hash-computation time period, with the hash value of a corresponding data record in a second database (e.g., in database 13) to determine if the data records need to be synchronized across the databases.

The hash value-based algorithms described above may also be used to identify which data records (in either database 120 or in database 13) have been changed or updated and need to be synchronized across the databases in the case of structured business data objects associated with technical keys (e.g., time stamps, or code values). If the technical keys (e.g., time stamps, or code values) are considered to be part of the data records, any difference in the technical keys of a pair of data records would be mathematically reflected as a difference in the hash values of the pair of data records and thus identify a need for the pair of data records to be synchronized across the databases.

Figure 2:
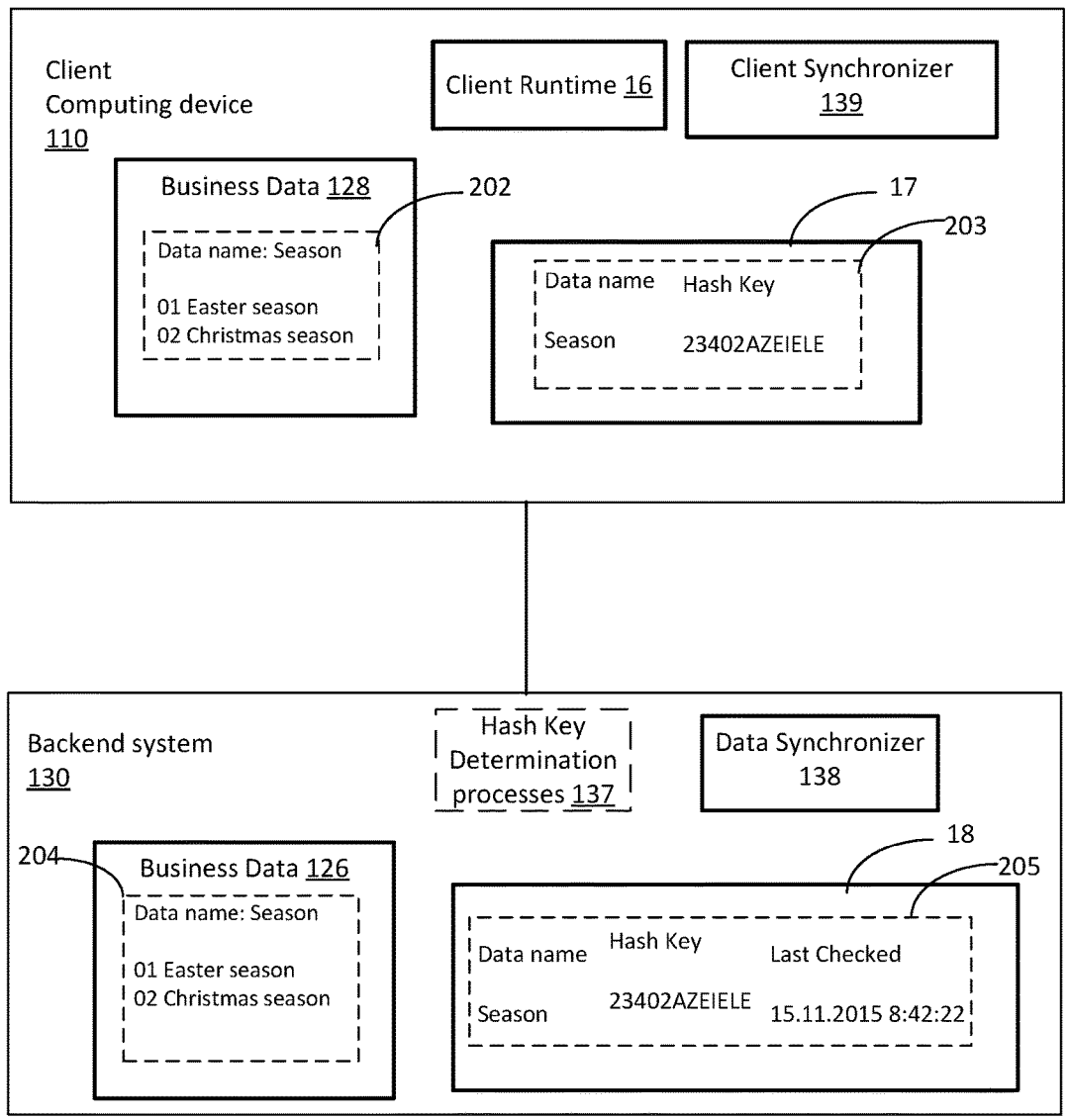
FIG. 2 is schematic block diagram illustration of an example operation of a data synchronizer in the system of FIG. 1 for synchronizing data records in a backend database and a client database 13, in accordance with the principles of the disclosure herein.
Figure 3:
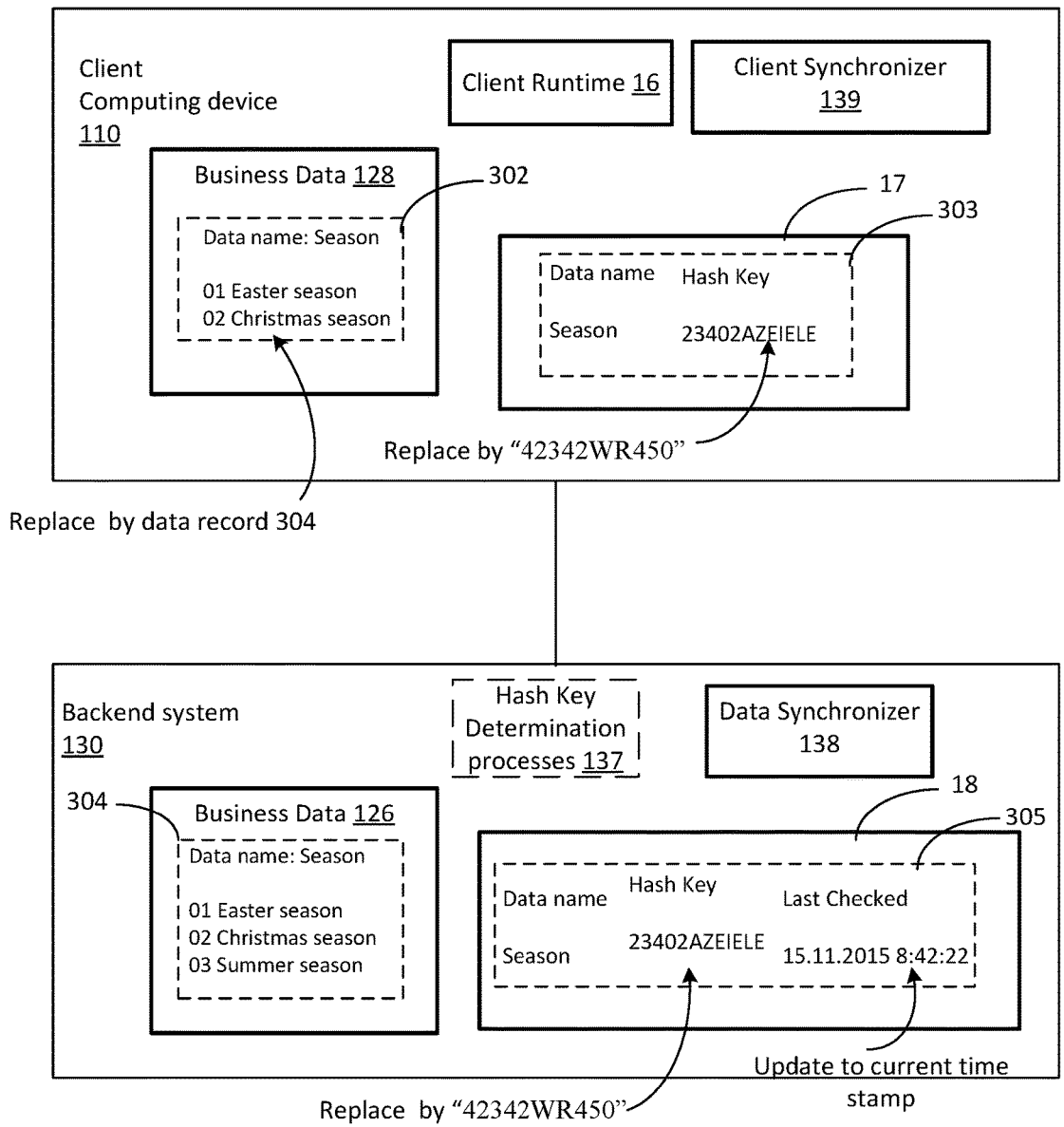
FIG. 3 is schematic block diagram illustration of another example operation of a data synchronizer in the system of FIG. 1 for synchronizing data records in a backend database and a client database 13, in accordance with the principles of the disclosure herein.
Figure 4:
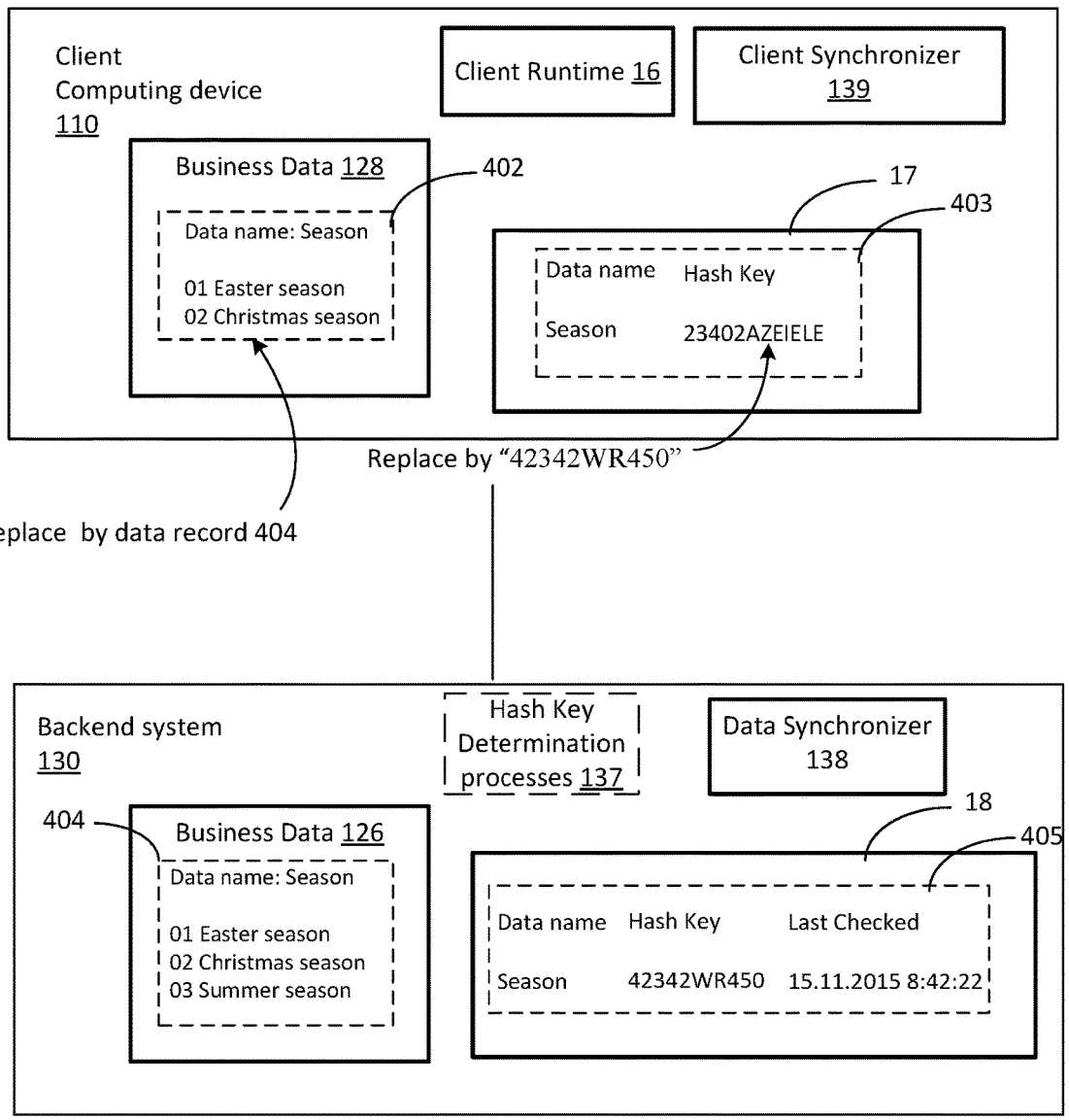
FIG. 4 is schematic block diagram illustration of yet another example operation of a data synchronizer in the system of FIG. 1 for synchronizing data records in a backend database and a client database 13, in accordance with the principles of the disclosure herein.

FIGS. 2-4 show examples 200-400 of the operation of data synchronizer 138/client synchronizer 139 for synchronizing data records in backend database 120 and client database 13, in accordance with the principles of the disclosure herein.

Example 200—Cache Key Valid, No Redetermination of Cache Key

In example 200 shown in FIG. 2, database 120/business data 126 in backend system 130 and database 13/business data 128 in client computing device 110 each include a data record (e.g., data records 204 and 202, respectively) under data name "Season" (i.e. list: "01 Easter Season" and "02 Christmas Season"). Corresponding to each data record in database 120/business data 126, backend system 130 may include a cached administrative record of the hash value of the data record and a time stamp of the time at which the hash value was last computed or checked. For example, as shown in the FIG. 2, backend system 130 includes an administrative record 205 (i.e. Data name Season; Hash key 23402AZEIELE; Last Checked 15.11.2015 8:42:22) in cache 18 for the data record 204 under data name "Season"

in business data 126. Similarly, client computing device 110 may include a cached administrative record of the hash values of the client data records in business data 128. For example, as shown in the FIG. 2, client computing device 110 includes an administrative record 203 (i.e. Data name: Season; Hash key 23402AZEIELE) in cache 17 for the client data record with the data name "Season" in business data 128.

Client runtime 16 in computing device 110 may trigger or specifically request (e.g., automatically when computing device 110 comes online, or upon specific user request) synchronization of database 13 and database 120 by data synchronizer 138/client synchronizer 139. In response to the automatic trigger or specific request, client synchronizer 139 may retrieve the client data record name (e.g., "Season") and the client data record hash value (e.g., "23402AZEILE") from cache 17 stored on computing device 110 and send the information to backend system 130. In response, data synchronizer 138 may retrieve the administrative record 205 (i.e. Data name: Season; Hash key 23402AZEIELE; Last Checked 15.11.2015 8:42:22) for the corresponding data record under the data name Season from cache 18 in backend system 130. Data synchronizer 138 may then check if the hash key value in the administrative record 205 was computed or validated for the current hash-computation time period (e.g., within the last 4 hours). For the example shown in FIG. 2, it may be assumed that the hash key value in administrative record 205 was computed or validated for the current hash-computation time period (e.g., within the last 4 hours).

If the hash key value in administrative record 205 was computed or validated for the current hash-computation time period (as assumed for this example), data synchronizer 138 may then further check if the client data record hash value (e.g., Hash key: 23402AZEILE) received from computing device 110 is the same as the hash value (e.g., Hash key 23402AZEIELE) in administrative record 205 retrieved from cache 18. If the hash key values for the data records (i.e. data records 202 and 204) under the data name Season are the same (as shown in the example of FIG. 2), data synchronizer 138 may determine that there is no need to update data record 202 under the data name Season in database 13 on computing device 110.

Example 200—Cache Key Valid, Redetermination of Cache Key

If the check by data synchronizer 138 shows that the hash key value in administrative record 205 retrieved from cache 18 was not computed or validated for the current hash-computation time period (e.g., within the last 4 hours), data synchronizer 138 may call hash key determination processes 137 to compute a current hash-value of data record 204 (e.g., data record Season). Hash key determination processes 137 may retrieve the entire data record (e.g., data record Season) code list from database 120/business data 126, concatenate the code list to a string, and apply a hash function to the string to generate the current hash-value of data record 204. Hash key determination processes 137 may store the newly generated current hash-value of data record 204 in administrative record 205 in cache 18 and also update the timestamp in administrative record 205 to the current timestamp. In the example shown in FIG. 2, the newly generated current hash-value happens to be the same as the previous hash-value.

Data synchronizer 138 may then compare the client data record hash value (e.g., Hash key: 23402AZEILE) received from computing device 110 with the newly generated current hash-value of the data record in administrative record 205 retrieved from cache 18. If the hash key values for the data records under the data name Season are the same (e.g., as shown in the example of FIG. 2), data synchronizer 138 may determine that there is no need to update data record 202 under the data name Season in database 13 on computing device 110.

Example 300—Cache Key Not Valid, Redetermination of Cache Key

In example 300 shown in FIG. 3, database 120/business data 126 in backend system 130 includes a data record 304 under data name "Season" (i.e. list: "01 Easter Season," "02 Christmas Season," and "03 Summer Season"), which is different than data record 204 under data name "Season" (i.e. list: "01 Easter Season," and "02 Christmas Season") in example 200. However, in example 300, as shown in FIG. 3, administrative record 305 includes the same hash key value (i.e. 23402AZEIELE) for data record 304 as the hash key value for data record 204 shown in FIG. 2.

As in example 200, in example 300, client runtime 16 in computing device 110 may trigger or specifically request (e.g., automatically when computing device 110 comes online, or upon specific user request) for synchronization of database 13 and database 120 by data synchronizer 138/client synchronizer 139. In response, client synchronizer 139 may retrieve the client data record name (e.g., "Season") and the client data record hash value (e.g., "23402AZEILE") from cache 17 stored on computing device 110 and send the information to backend system 130. Further, data synchronizer 138 may retrieve administrative record 305 (i.e. Data name: Season; Hash key 23402AZEIELE; Last Checked 15.11.2015 8:42:22) for the corresponding data record 404 from cache 18 in backend system 130. Data synchronizer 138 may then check if the hash key value in the administrative record 305 was computed or validated for the current hash-computation time period (e.g., within the last 4 hours).

For example 300 shown in FIG. 3, it may be assumed that the hash key value in the administrative record 305 was not computed or validated for the current hash-computation time period (e.g., within the last 4 hours). Data synchronizer 138 may call hash key determination processes 137 to compute a current hash-value of data record 304. Hash key determination processes 137 may retrieve the entire data record (e.g., data record Season) code list (i.e. list: "01 Easter Season," "02 Christmas Season," and "03 Summer Season) from database 120/business data 126, concatenate the code list to a string, and apply the hash function to the string to generate a current hash-value (e.g., "42342WR450") of data record 304.

Hash key determination processes 137 may store the newly generated current hash-value of data record 304 in administrative record 305 in cache 18 and also update the timestamp in administrative record 305 to a current timestamp.

Data synchronizer 138 may then compare the hash value (e.g., 23402AZEILE) of data record 302 received from computing device 110 with the newly generated current hash value (e.g., 42342WR450) of data record 304. Since the two hash values are different, synchronizer 138 may determine that there is a need to update or replace data record 302 in database 13 on computing device 110 with the contents of data record 304 in database 120. Data synchronizer 138 may, for example, retrieve the entire code list (i.e. list: "01 Easter Season," "02 Christmas Season," and "03 Summer Season) of data record 304 from database 120/business data 126 and send the entire code list to client runtime 16, which may store the new list as an updated data record 302. Client runtime 16 may also update the corresponding hash value in administrative record 17 to the newly generated current hash value (e.g., 42342WR450).

Example 4—Cache Key not Valid, No Redetermination of Cache Key

In example 400 shown in FIG. 4, database 120/business data 126 in backend system 130 includes a data record 404 under data name "Season" (i.e. list: "01 Easter Season," "02 Christmas Season," and "03 Summer Season") and a corresponding hash key value "42342WR450" in administrative record 405. Further, database 13/business data 128 in client computing device 110, as in examples 200 and 300, includes a data record 402 under data name "Season" (i.e. list: "01 Easter Season" and "02 Christmas Season") and a corresponding hash key value "23402AZEIELE" in administrative record 403.

As in examples 200 and 300, in example 400, client runtime 16 in computing device 110 may trigger or request synchronization of database 13 and database 120 by data synchronizer 138/client synchronizer 139. In response, client synchronizer 139 may retrieve the client data record name (e.g., "Season") and the client data record hash value (e.g., "23402AZEILE") from cache 17 stored on computing device 110 and send the information to backend system 130. Further, data synchronizer 138 may retrieve administrative record 405 (i.e. Data name: Season; Hash key 42342WR450; Last Checked 15.11.2015 8:42:22) for the corresponding data record 404 from cache 18 in backend system 130. Data synchronizer 138 may then check if the hash key value in the administrative record 405 was computed or validated for the current hash-computation time period (e.g., within the last 4 hours). For this example 400, it may be assumed that the hash key value in the administrative record 405 for data record 404 was computed or validated for the current hash-computation time period (e.g., within the last 4 hours). Thus, unlike example 300, in example 400, data synchronizer 138 may determine that there is no need to call hash key determination processes 137 to recompute a current hash-value of data record 304.

Data synchronizer 138 may then compare the hash value (e.g., 23402AZEILE) of data record 402 received from computing device 110 and determine that it is different than the hash value (e.g., 42342WR450) of data record 404. Since the two hash values are different, synchronizer 138 may determine that there is a need to update or replace data record 402 in database 13 on computing device 110 with the contents of data record 404 in database 120. As in example 300, data synchronizer 138 may, for example, retrieve the entire code list (i.e. list: "01 Easter Season," "02 Christmas Season," and "03 Summer Season) of data record 404 from database 120/business data 126 and send the entire code list to client runtime 16, which may store the new list as an updated data record 402. Client runtime 16 may also update the corresponding hash value in administrative record 17 for updated data record 402 to the hash value (e.g., 42342WR450) of data record 404.

FIG. 5 shows an example method 500 for sharing and distributing data across backend databases and various client computing devices in a business computing system, in accordance with the principles of the disclosure herein.

Method 500 may be utilized to synchronize business data on a backend computer system, which hosts a business application, and local data stored on frontend client computing devices, which can operate or interact with the business application in either online or offline modes.

The business data processed by the business application and stored in the backend databases may include business objects such as activities, accounts, sales orders, invoices and other business documents, etc. The business data may be manipulated or processed by a frontend client computing device even when offline to generate new data offline. For synchronizing business data on the frontend client computing device with the business data in the backend databases, the backend computer systems must identify which business data on the frontend client computing device is outdated or needs to be replaced. In the case of "structured" business objects data, the identification of which business data is outdated or needs to be replaced may be based on traditional validation keys associated with the structured business objects data. The traditional validation keys associated with the structured business objects data may, for example, include a timestamp indicating the time when a document/data was last changed, or include a universally unique identifier (UUID), which is generated by an algorithm with values that are based on a machine's network address to identify Internet objects or data.

Method 500 (which may, for example, be implemented using system 100 described above with reference to FIGS. 1-4) is not limited to synchronizing structured business objects data, but can be used to synchronize "unstructured" or "code-less" business objects data, which may not associated with traditional validation keys.

In example implementations, method 500 includes initiating, at backend server, synchronization of a data record stored locally on a client computing device with a corresponding data record stored in a backend database (510), receiving a hash value of the data record stored locally on the client computing device (520), retrieving a hash value of the corresponding data record from a cache on the backend server (530), comparing the hash value of the data record stored locally on a client computing device and the hash value of the corresponding data record stored in the backend database (540); and, based on the comparing, sending information about the corresponding data record stored in the backend database to the client computing device (550). The client computing device may use the information received from the backend server to update the data record stored locally on the client computing device.

In method 500, initiating synchronization of a data record stored locally on a client computing device 510 may include initiating the synchronization automatically when the client computing device comes online, or initiating the synchronization upon receiving a specific request from the client computing device.

Further, in method 500, retrieving the hash value of the corresponding data record from a cache on the backend server 530 may include retrieving a time stamp indicating when the hash value was last created or validated, and if the hash value was not created or validated in a current hash-value validation time period, recomputing the hash value of the corresponding data record. Method 500 may further include updating the cache on the backend server with the recomputed hash value and a time stamp indicating when the hash value was last created or validated in the cache.

In method 500, comparing the hash value of the data record stored locally on a client computing device and the hash value of the corresponding data record stored in the backend database 540 may include determining if the hash values are the same and accordingly determining that there is no need to update the data record stored locally on the client computing device.

Comparing the hash value of the data record stored locally on a client computing device and the hash value of the corresponding data record stored in the backend database

540 may also include determining if the hash values are different and accordingly determining that there is a need to update the data record stored locally on the client computing device.

The various systems, apparatus or techniques described herein may be implemented in digital electronic circuitry, or in computer hardware, firmware, software, or in combinations of them. The systems, apparatus and techniques may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods (e.g. method 500) may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems, apparatus or techniques may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for synchronizing data records in a backend database coupled to a backend server and data records in a client database coupled to a client computing device, each database including a respective data record under a same data record name, the method comprising:
    generating, at the backend server and during each of a plurality of periodic hash-computation time periods, a hash value of each of a plurality of backend data records, wherein the backend server is configured to store data for the plurality of the backend data records without storing an associated time stamp indicative of a time the data is stored, wherein the start of each periodic hash-computation time period is scheduled to minimize disruptions due to computational loading of the backend server;
    storing, at the backend server, a cached administrative record for each of the plurality of backend data records, each cached administrative record including the generated hash value and a hash time stamp of the time at which the hash value was generated;
    receiving, at the backend server and from the client computing device, a client data record name and a client data record hash value, the client data record hash value being generated by the client computing device based on a client data record associated with the client data record name;
    initiating, at the backend server and in response to receiving the client data record name and the client data record hash value from the client computing device, synchronization, including:
        retrieving, at the backend server, a cached administrative record for a backend data record with a same name as the received client data record name;
        determining, at the backend server and based on the hash time stamp in the retrieved cached administrative record, whether the hash value in the retrieved cached administrative record was generated after the start of the current hash-computation time period;
        when the hash value in the retrieved cached administrative record is determined to be generated after the start of the current hash-computation time period, determining whether the received client data record hash value is the same as the hash value in the retrieved cached administrative record, and when the hash values are the same, determining that there is no need to send the backend data record associated with the retrieved cached administrative record to the client computing device.

2. The method of claim 1, wherein initiating synchronization at the backend server includes initiating the synchronization automatically when the client computing device comes online.

3. The method of claim 1, wherein initiating synchronization at the backend server includes initiating synchronization upon receiving a request from the client computing device when online.

4. The method of claim 1, wherein the synchronization further includes:
when the hash value in the retrieved cached administrative record was generated before the start of the current hash-computation time period, retrieving the entire backend data record associated with the retrieved cached administrative record and generating a current hash value of the retrieved backend data record; and
storing the newly generated current hash value in the cached administrative record for the backend data record.

5. The method of claim 4, wherein generating a current hash value of the retrieved backend data record further includes updating the cached administrative record of the backend data record on the backend server with a time stamp indicating when the hash value was generated.

6. The method claim 5 wherein the synchronization further includes:
comparing the received client data record hash value with the newly generated current hash value of the retrieved backend data record; and
when the two hash values are different, determine that there is a need to send the retrieved backend data record to the client computing device to enable the client computing device to update a client data record in the client database with the contents of the retrieved backend data record, and send the entire backend data record to the client database to be stored as an updated client data record.

7. The method of claim 6 wherein the client computing device updates the hash value in the cached administrative record of the client data record to the newly generated current hash value.

8. The method of claim 4, wherein the synchronization further includes:
when the hash value in the retrieved cached administrative record was generated after the start of the current hash-computation time period, comparing the received client data record hash value with the hash value in the retrieved cached administrative record; and
when the two hash values are different, determine that there is a need to send the retrieved backend data record to the client computing device to enable the client computing device to update a client data record in the client database, and send the entire backend data record to the client database to be stored as an updated client data record.

9. The method of claim 8, further comprising, using the information about the corresponding data record stored in the backend database sent by the backend server to update the data record stored locally on the client computing device.

10. A system for synchronizing data records in a backend database and data records in a client database, each database including a respective data record under a same data record name, the system, comprising:
a backend server coupled to the backend database; and
a computer network connection making the backend server accessible to a client computing device coupled to the client database, the backend server configured to at least:
generate, during each of a plurality of periodic hash-computation time periods, a hash value of each of a plurality of backend data records, wherein the backend server is configured to store data for the plurality of the backend data without storing an associated time stamp indicative of a time the data is stored, wherein the start of each periodic hash-computation time period is scheduled to minimize disruptions due to computational loading of the backend server;
store a cached administrative record for each of the plurality of the backend data records, each cached administrative record including the generated hash value of the backend data record and a time stamp of the time at which the hash value was generated; and
initiate, in response to receiving a client data record name and a client data record hash value from the client computing device, synchronization, including:
retrieving, at the backend server, a cached administrative record for a backend data record with a same name as the received client data record name;
determining, at the backend server, whether the hash value in the retrieved cached administrative record was generated after the start of the current hash-computation time period;
when the hash value in the cached administrative record is determined to be generated after the start of the current hash-computation time period, determining whether the received client data record hash value is the same as the hash value in the retrieved cached administrative record, and when the hash values are the same, determining that there is no need to send the backend data record associated with the retrieved cached administrative record to the client computing device to enable the client computing device to update a client data record in the client database.

11. The system of claim 10, wherein the backend server is configured to initiate synchronization automatically when the client computing device comes online.

12. The system of claim 10, wherein the backend server is configured to initiate synchronization upon receiving a request from the client computing device.

13. The system of claim 10, wherein the synchronization further includes:
when the hash value in the retrieved cached administrative record was generated before the start of the current hash-computation time period, retrieving the entire backend data record and generating a current hash value of the retrieved backend data record; and
storing the newly generated current hash value in the cached administrative record for the backend data record.

14. The system of claim 13, wherein generating a current hash value of the retrieved backend data record further includes updating the cached administrative record of the backend data record on the backend server with a time stamp indicating when the hash value was generated.

15. The system of claim 14, wherein the synchronization further includes:
comparing the received client data record hash value with the newly generated current hash value; and when the two hash values are different, determine that there is a need to send the retrieved backend data record to the client computing device to enable the client computing device to update a client data record in the client database, and send the entire backend data record to the client database to be stored as an updated client data record.

16. The system of claim 15, wherein the client device updates the hash value in the cached administrative record of the client data record to the newly generated current hash value.

17. The system of claim 10, wherein the synchronization further includes:
when the hash value in the retrieved cached administrative record was generated after the start of the current hash-computation time period, comparing the received client data record hash value with the hash value in the retrieved cached administrative record; and
when the two hash values are different, determine that there is a need to send the backend data record associated with the retrieved cached administrative record to the client computing device to enable the client computing device to update a client data record in the client database, and send the entire the backend data record to the client database to be stored as an updated client data record.

18. The system of claim 10, wherein the backend server is further configured to send information about the corresponding data record stored in the backend database to the client computing device to update the data record stored locally on the client computing device.

19. The system of claim 10, wherein the corresponding data record stored in the backend database includes an unstructured code-less business data.

\* \* \* \* \*